United States Patent [19]

Hunter, Jr. et al.

[11] Patent Number: 5,557,926
[45] Date of Patent: Sep. 24, 1996

[54] PULSE DETONATION APPARATUS WITH INNER AND OUTER SPHERICAL VALVES

[75] Inventors: Louis G. Hunter, Jr., Fort Worth; Don D. Winfree, Keller, both of Tex.

[73] Assignee: Lockheed-Martin, Fort Worth, Tex.

[21] Appl. No.: 439,865

[22] Filed: May 12, 1995

Related U.S. Application Data

[63] Continuation-in-part of Ser. No. 410,334, Mar. 24, 1995, which is a continuation-in-part of Ser. No. 265,661, Jun. 24, 1994, Pat. No. 5,473,885.

[51] Int. Cl.$^6$ .................... F02K 7/02; F02C 5/02
[52] U.S. Cl. ............................ 60/247; 60/39.78
[58] Field of Search ................ 60/39.34, 39.38, 60/39.39, 39.40, 39.76, 39.78, 39.81, 201, 247, 248; 431/1

[56] References Cited

U.S. PATENT DOCUMENTS

| | | | |
|---|---|---|---|
| 2,623,355 | 12/1952 | Boulet | 60/39.38 |
| 3,634,778 | 1/1972 | Melikian et al. | |
| 3,812,783 | 5/1974 | Yang et al. | |
| 3,977,185 | 8/1976 | Sawada | 60/39.78 |
| 4,645,448 | 2/1987 | Otto et al. | 60/39.76 |
| 4,741,154 | 5/1988 | Eidelman | |
| 4,870,903 | 10/1989 | Carel et al. | |
| 4,976,232 | 12/1990 | Coates | |
| 4,989,558 | 2/1991 | Coates | |
| 4,989,576 | 2/1991 | Coates | |
| 5,109,814 | 5/1992 | Coates | |
| 5,280,705 | 1/1994 | Epstein et al. | 60/247 |
| 5,345,758 | 9/1994 | Bussing | 60/39.76 |

*Primary Examiner*—Louis J. Casaregola
*Attorney, Agent, or Firm*—James E. Bradley

[57] ABSTRACT

A pulse detonation device is used to create high temperature high pressure pulses, such as for generating thrust for an aircraft or rocket. The device has a rotating cylinder located within a sleeve. A jacket is spaced outward from the sleeve. The seal and the sleeve are rotatable relative to each other. Each has ports which align with each other to communicate the annular passage with the annulus between the jacket and the sleeve. The jacket has at least one outer port. An outer valve in the exterior of the jacket opens and closes the outer port. A first portion of a fuel mixture, such as oxygen, is supplied to the inner passage within the cylinder, to flow into the annulus through the inner ports. The second ingredient of the fuel mixture, such as fuel, is supplied through the outer valves and outer ports to the annulus. An igniter in the annulus creates a detonation wave.

19 Claims, 4 Drawing Sheets

ડ5,557,926

PULSE DETONATION APPARATUS WITH INNER AND OUTER SPHERICAL VALVES

CROSS REFERENCE TO RELATED APPLICATION

This invention is a continuation-in-part of application Ser. No. 08/410,334 filed Mar. 24, 1995, Pulse Detonation Apparatus With Spherical Seals, which is a continuation-in-part of application Ser. No. 08/265,661, filed Jun. 24, 1994, Pulse Detonation Engine (U.S. Pat. No. 5,473,885).

BACKGROUND OF THE INVENTION

1. Field of the invention

This invention relates in general to propulsion systems, and in particular to pulse detonation engines such as for aircraft, missiles and rockets.

2. Description of the Prior Art

A pulse detonation engine is an apparatus which produces a high pressure exhaust from a series of repetitive detonations within a detonation chamber. The process is a constant volume heat addition process. A gaseous fuel is detonated within a chamber, causing a pulse detonation wave which propagates at supersonic speeds. The detonation wave compresses the fluid within the chamber, increasing its pressure, density and temperature. As the detonation wave passes out the open rearward end, thrust is created. The cycle is then repeated.

At high speeds, such as Mach 2 to about Mach 3.5, such an engine would be theoretically more efficient than conventional turbojets because the engine does not require compressors or turbines. A pulse detonation engine supplying the same amount or more of thrust as a conventional gas turbine engine would theoretically weigh less. Also, a pulse detonation engine could be used as a propulsion system for a rocket.

Another prior art engine, known as a pulse jet engine, was employed in World War II. That engine relied on slow moving deflagration, not detonation. The deflagration waves are subsonic, not supersonic waves. A pulse jet engine is not a pulse detonation engine.

Although theoretically desirable, to applicant's knowledge there are no pulse detonation engines being used as propulsion devices at this time. The reason may be the problems resulting from very high detonation chamber temperatures, approximately 3,500° F. Also, initiating repetitive detonations is a problem. The detonation chamber must have an inlet port for supplying fuel, and the inlet port must close just before the detonation occurs. Very high pressures occur during the detonation. The valves must be capable of sealing against the high pressures under the high temperatures.

SUMMARY OF THE INVENTION

The pulse detonation apparatus of this invention has a cylinder which is received closely within a sleeve. A jacket is spaced outward from the sleeve. An annulus between the jacket and the sleeve has an upstream end wall and an open downstream end. The cylinder and sleeve are rotatable relative to each other. The cylinder and sleeve each has one inner port which aligns with the other to communicate the interior of the cylinder with the annulus as the sleeve and cylinder rotate.

The jacket has at least one outer port. An outer valve means is mounted to the outer part for opening and closing the outer port. The opening and closing of the outer port is simultaneous with the opening and closing of the inner ports.

A first portion of a fuel mixture is introduced to the inner passage of the cylinder. A second portion of the fuel mixture is introduced to the outer port. The simultaneous opening of the inner and outer ports results in an injection of the first and second portions into the annulus. These portions mix to become combustible. An igniter detonates the combustible mixture to create a detonation wave which passes out the open downstream end of the annulus.

Preferably, the valve and seal arrangement for both the inner and outer ports comprise spherical seats engaged by spherical balls or elements. The spherical elements are rotated while the seats remain stationary. The seats contain seals for sealing the junction between the ports.

DETAILED DESCRIPTION OF THE INVENTION

Figure 1:
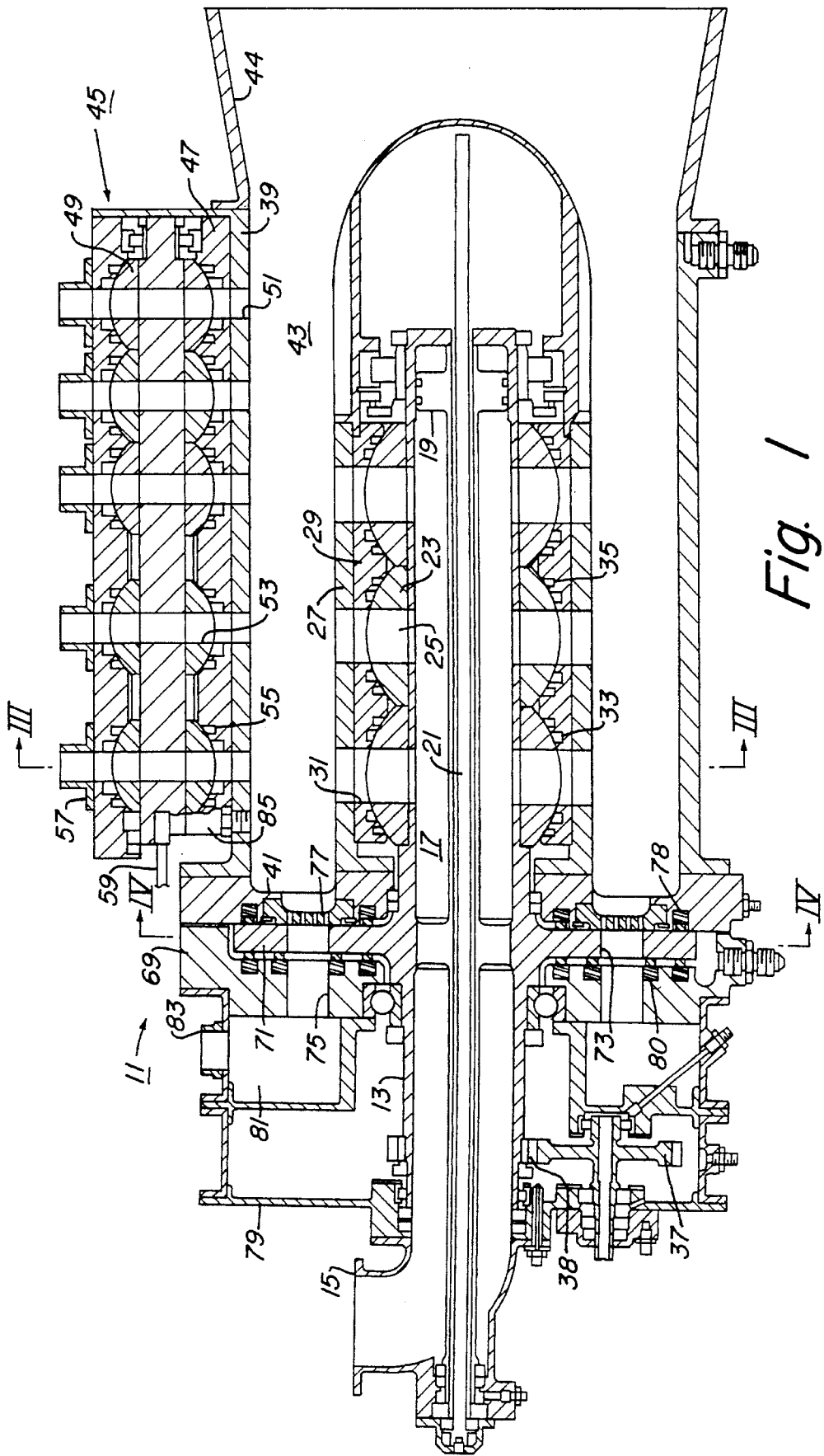
FIG. 1 is a sectional view illustrating a pulse detonation apparatus constructed in accordance with this invention.

Referring to FIG. 1, pulse detonation apparatus 11 is configured for use as an air breathing rocket engine. Apparatus 11 has a rotatable cylinder 13 which extends along a longitudinal axis. Cylinder 13 has a manifold 15 on its upstream end for .introducing a first portion of a gaseous fuel mixture into the bore or inner passage 17 of cylinder 13. A plug 19 closes the downstream end of inner passage 17. A shaft 21 extends co-axially through cylinder 13.

Figure 2:
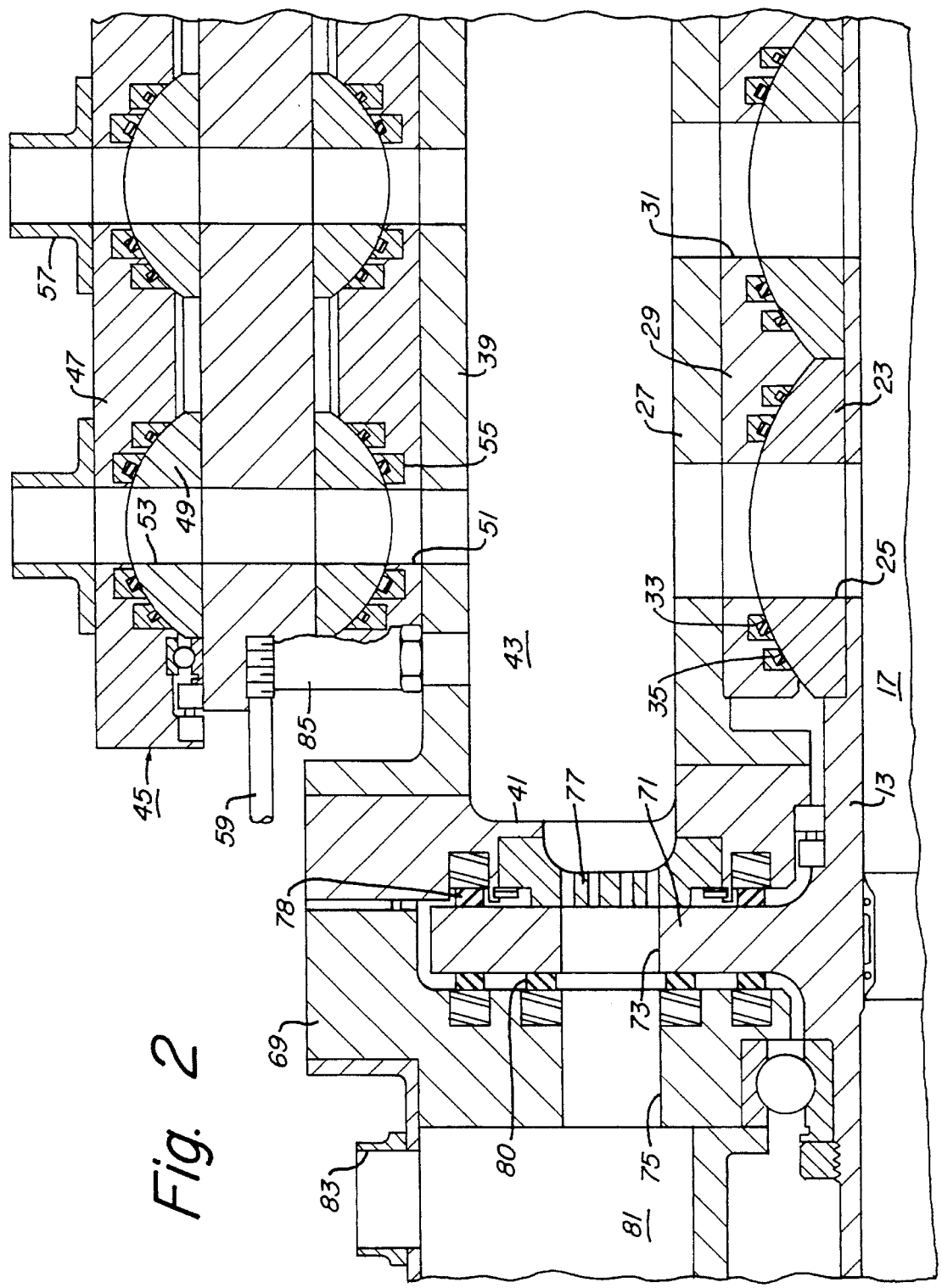
FIG. 2 is an enlarged partial sectional view of a portion of the apparatus of FIG. 1.

Referring also to FIG. 2, cylinder 13 has a plurality of spherical, convex, inner elements 23 rigidly secured to its exterior. The exterior of each inner element 33 is spherical with truncated ends which abut adjacent inner elements 23. Each inner element 23 has a central hole through which cylinder 13 co-axially extends. In the embodiment shown, there are three of the inner elements 23 spaced equally along the longitudinal axis. Two inner ports 25, spaced 180 degrees from each other, extend through each inner element 23 and cylinder 13, communicating with inner passage 17.

A cylindrical sleeve 27 surrounds cylinder 13. A plurality of spherical, concave, inner seats 29 are rigidly mounted to the interior of sleeve 27. Inner seats 29 rotatably receive the inner elements 23. Inner seats 29 have two inner ports 31, spaced 180 degrees apart from each other, which also extend through sleeve 27. Seals 33, 35 are mounted to inner seats 29. A pair of the seals 33, 35 encircles each of the sleeve inner ports 31. Each seal 33, 35 is concentric with one of the inner ports 31. A gear 37 is rotated by an external drive means which engages gear 38 to rotate cylinder 13. As cylinder 13 is rotated, the inner ports 25, 31 will align with one another twice per revolution.

A jacket 39 extends concentrically around sleeve 27 and is spaced radially outward a considerable distance. Jacket 39 and sleeve 27 are connected together by an upstream end wall 41. The space between jacket 39 and sleeve 27 is an annulus 43 which has an open downstream end. In the embodiment shown, a divergent nozzle 44 is located at the open downstream end.

Figure 3:
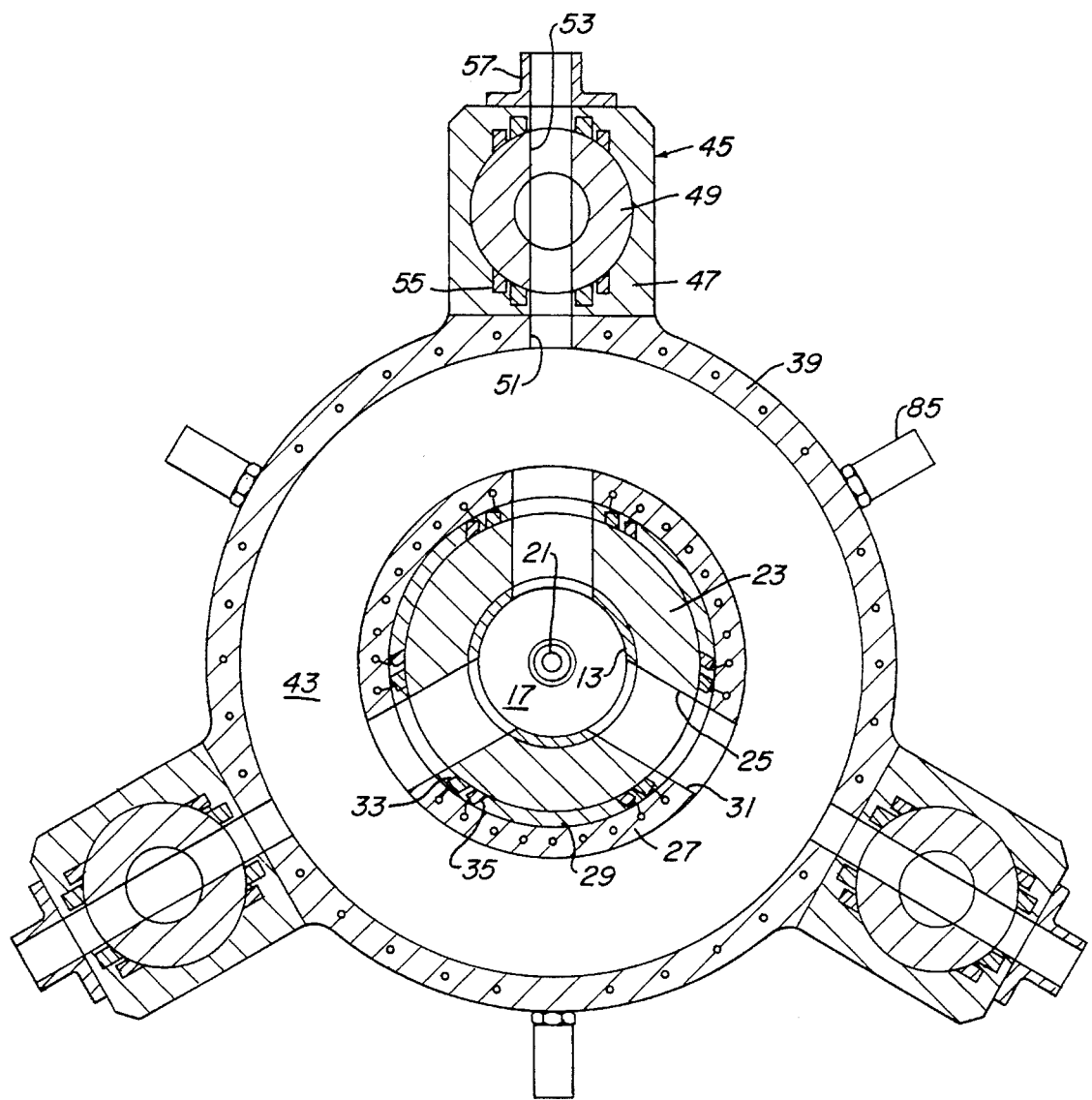
FIG. 3 is a sectional view of FIG. 1, taken along the line III—III of FIG. 1.

A plurality of outer valves 45 are mounted to the exterior of jacket 39. As shown in FIG. 3, there are three sets of outer valves 45, each spaced 120 degrees apart from each other. Each set of outer valves 45 comprises a plurality of individual valves 45 spaced in a row parallel to the longitudinal axis. As shown in FIG. 1, in the embodiment shown, there are five of the outer valves 45 in each row, with the latter three being spaced more closely to each other than the first two. Each of the outer valves 45 has a spherical, concave outer seat 47 rigidly mounted to jacket 39. Each seat 47 is a housing having a rectangular exterior, as shown in FIG. 3, with a concave spherical receptacle for rotatably receiving a spherical outer element 49.

Each outer element 49 has a spherical exterior and is rotatable within one of the outer seats 47. Each outer seat 47 has two outer seat ports 51 spaced 180 degrees apart from each other. Each outer element 49 has an outer valve port 53 extending therethrough perpendicular to its axis of rotation for registering with outer seat ports 51 twice for each revolution. A pair of concentric seals 55 are mounted within outer seats 47 for sealing around each of the outer seat ports 51. An outer one of the outer seat ports 51 of each individual valve 45 leads to an outer manifold 57. An inner one of the outer seat ports 51 extends through jacket 39 in communication with annulus 43.

A drive shaft 59 rotates outer elements 49 within outer seats 47. Drive shaft 59 extends through a central hole in each of the outer elements 49. Each of the outer elements 49 is rigidly secured to drive shaft 59, as by a key. The outer ports 523 of each outer element 49 also extends through drive shaft 59. Drive shaft 59 is driven by an external source, preferably the same that drives gear 37 (FIG. 1). Drive shaft 59 and gear 37 are timed to cause inner ports 25, 31 to open and close simultaneously with outer ports 51, 53.

Figure 5:
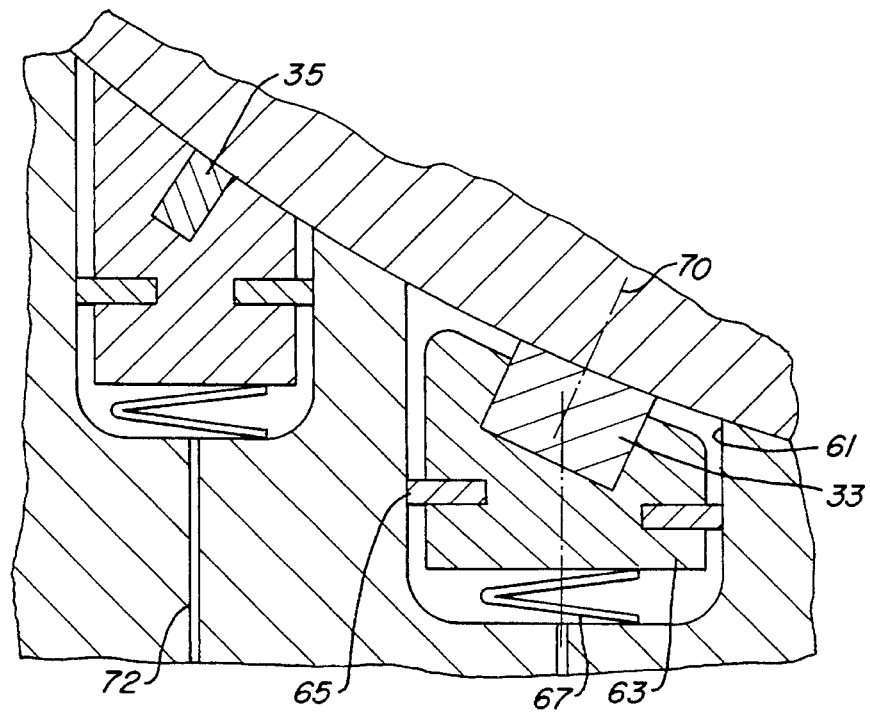
FIG. 5 is an enlarged sectional view of a portion of one of the seals for one of the valves of the apparatus of FIG. 1.

FIG. 5 illustrates a pair of seals 33, 35 for one of the inner seats 29. Seals 55 (FIGS. 1–3) will be constructed in the same manner. Seals 33, 35 are concentric with one another, with the smaller diameter seal 33 located within the larger diameter seal 35 and located closer to the inner port 31 (FIG. 1) than the larger diameter seal 35. Each seal 33, 35 is concentric with an axis extending through sleeve inner port 31. Each seal 33, 35 is located within an annular groove 61.

Seals 33, 35 are carried by a carrier ring 63 which is capable of movement within groove 61. A piston ring 65 is located on the inner and outer diameters of carrier ring 63 and seals carrier ring 63 to groove 61. A spring 67 urges carrier ring 63 radially outward to force the seals 33, 35 against one of the inner elements 23. A line 70 normal to the contacting surface of each seal 33, 35 is also normal to the convex surface of inner elements 23 and on a radial line from the center of the inner element 23. Spring 67, however, acts against carrier ring 63 along a line that is an acute angle relative to radial line 70. Each contacting surface of seals 33, 35 is a portion of a sphere.

Seal 33 will be subjected to higher pressures and higher temperatures than seal 35, because seal 33 is closer to inner ports 31 than seal 35. In the preferred embodiment, seal 33 has a larger thickness, resulting in more surface area per linear increment in contact with inner element 23 than seal 35. The smaller thickness or cross-sectional area of seal 35, however, enables it to seal higher pressures. Some leakage past seal 33 is expected, but seal 35 should completely seal against reactants from the detonation. Seal 33 is preferably of a higher temperature heat resistant material than seal 35. For example, seal 33 may be of ceramic while seal 35 may be of carbon. Lubricant passages 72 serve for supplying lubricant from the exterior to seals 33, 35. Seals 55 (FIG. 3) on outer seats 47 are constructed in the same manner as shown in FIG. 5.

Figure 4:
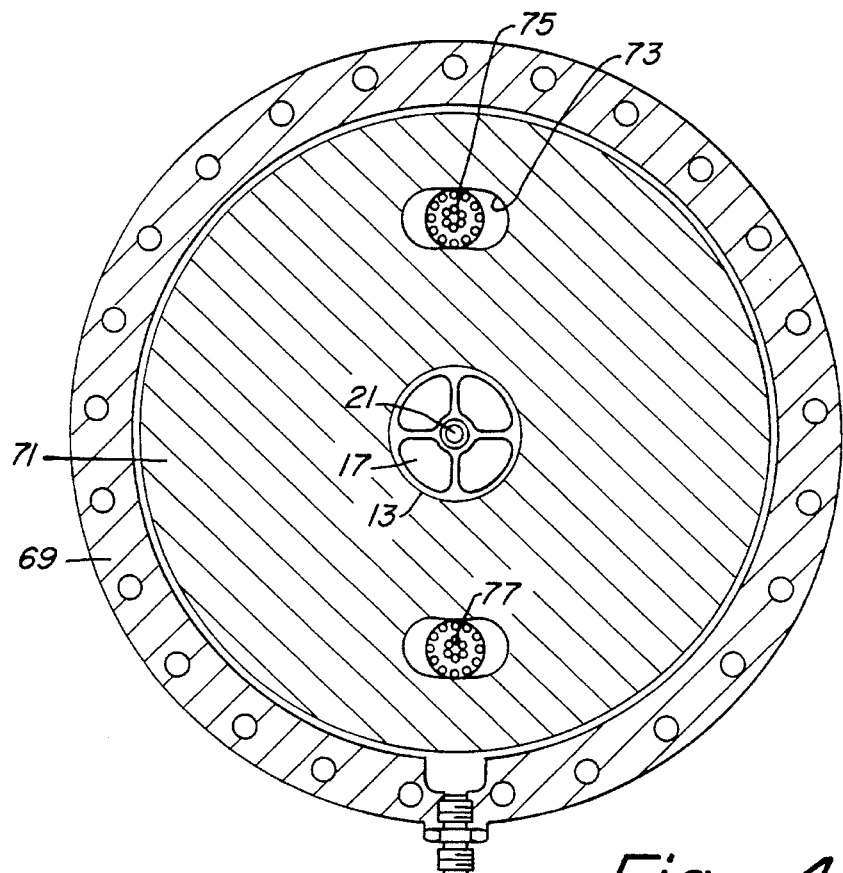
FIG. 4 is a sectional view of the apparatus of FIG. 1, taken along the line IV—IV of FIG. 1.

Referring to FIG. 1, a bulkhead 69 abuts and is parallel to upstream end wall 41. An inner annular clearance exists between bulkhead 69 and end wall 41. A purge valve plate 71 rotates within this clearance. Purge valve plate 71 is joined to cylinder 13 and extends radially outward from cylinder 13. Purge valve plate 71 has a pair of purge ports 73 spaced 180 degrees apart from each other, as shown in FIG. 4. Bulkhead 69 and end wall 41 have similar purge ports 75. A flame arrester 77 is located in the purge port 75 of end wall 41. As cylinder 13 and purge valve plate 71 rotate, plate purge ports 73 will register with the stationary purge ports 75 twice per revolution. Purge valve plate 71 is timed so that purge ports 73, 75 will open a selected interval after inner ports 25, 31 and outer ports 51, 53 close, and before they open again. Purge ports 71, 73 open after the fuel mixture has been detonated and the detonation wave discharged.

Inner and outer seals 78 extend around cylinder 13 in sealing contact with the upstream and downstream sides of purge valve plate 71. Seals 78 are located outboard and inboard of the purge ports 71, 73. Also, a seal 80 extends around and is concentric with each purge port 75 in bulkhead 69 for sealing each of the purge ports 75 when registered with one of the purge ports 73. Seals 78, 80 are spring biased and similar to seals 33, 35 shown in FIG. 5.

A gear case 79 extends upstream from bulkhead 69. Gear case 79 contains gear 37. A plenum 81 is located within gear case 79. Plenum 81 has a purge manifold 83 for receiving a purge fluid such as air. A plurality of igniters 85 (FIG. 5) are mounted to jacket 39, with three shown spaced 120 degrees apart. Igniters 85 may be spark plugs or lasers.

In operation, an exterior power source will rotate drive gear 37 and shaft 59. A first component of a fuel mixture, such as oxygen, will be supplied to inner passage manifold 15. A second component of a combustible fuel mixture, such as a hydrocarbon, will be supplied to outer manifolds 57. Shaft 59 and drive gear 37 are timed so that inner ports 31 open simultaneously with outer ports 53. The oxygen thus flows through inner ports 25, 31 into annulus 43. At the same time, gaseous hydrocarbon flows through outer ports 51, 53 into annulus 43. The two portions of the combustible fuel mixture mix within annulus 43.

Once inner ports 25, 31 and outer ports 51, 53 close, detonator 85 detonates the fuel mixture. This detonation creates a high temperature, high pressure, detonation wave which discharges out the nozzle 44, creating thrust. A reverberating expansion wave is create by the initial detonation wave. The expansion wave reflects off the upstream end wall 41 and. discharges from nozzle 44, creating additional thrust.

Immediately after, but prior to inner ports 25, 31 and outer ports 51, 53 opening again, purge plate ports 73 align with stationary ports 75. At the time of the detonation, purge plate ports 73 are out of registry with stationary ports 75. During detonation, inner and outer seals 78 and upstream end wall 41 provide a closed upstream end to annulus 43, preventing any products of the detonation from flowing into plenum 81 through the purge ports 73, 75. Once purge ports 73, 75 are aligned, air supplied through purge manifold 83 will flow through plenum 81, through purge ports 73, 75 and into annulus 43. Seals 80 seal the purge air from entry in gear case 79. The purge air removes hot products and dilutes trapped reactants from annulus 43. Immediately thereafter, inner ports 25, 31 align and outer housing ports 51, 53 align to open for repeating the process. The rotational speed of cylinder 13 is selected to create pulses at a rate of approximately 100 cycles per second.

Because of the rows of outer valves 45 and the separate manifolds 57, different gasses may be supplied to some of the outer valves 45 from others. For example, additional oxygen could be supplied to the three most downstream outer valves 45. If operated as a jet engine, large amounts of air could be supplied to the downstream outer valves 45. Also, the hydrocarbon portion of a fuel mixture could be supplied through the inner ports 25, 31 and the oxygen and air portLion of the fuel mixture through the outer valves 45. The components of the mixture combine in a form suitable for being detonated to create a detonation wave only after mixing in the detonation chamber or annulus 43. Prior to mixing in the annulus, the separate components are not in a form suitable for creating a detonation wave.

When pure oxygen to the exclusion of air is injected, the apparatus functions as a pure rocket. When some of the ports inject pure oxygen and others air, the apparatus functions as an air breathing rocket, where the detonation wave is started with oxygen and continues to propogate in the fuel/air mixture. ,Phis constitutes a dual oxidizer rocket.

The invention has significant advantages. Mixing the components of the fuel mixture in the detonation chamber adds safety to the apparatus. Flowing oxygen through one of the passages into the annulus and fuel through the other passage reduces the chance of an accidental explosion outside of the detonation annulus. The spherical seals provide effective sealing for the high temperature, high pressure detonations.

While the invention has been shown in only one of its forms, it should be apparent to those skilled in the art that it is not so limited, but is susceptible to various changes without departing from the scope of the invention.

We claim:

1. A pulse detonation apparatus, comprising in combination:

a cylinder which has a longitudinal axis, an inner passage extending along the longitudinal axis, and a closed downstream end;

a sleeve which closely receives the cylinder;

a jacket which is spaced outward from the sleeve, providing an annulus between the jacket and the sleeve which has an upstream end wall and an open downstream end;

the cylinder and the sleeve being rotatable relative to each other;

the sleeve and the cylinder each having at least one inner port which cyclically align with each other to communicate the inner passage with the annulus;

at least one outer port in the jacket and at least one outer valve means mounted to the outer port for opening and closing the outer port;

cylinder drive means for causing relative rotation between the cylinder and sleeve to open and close the inner ports;

outer valve drive means for actuating the outer valve means to open and close the outer port;

means for introducing a first component of a fuel mixture into the inner passage and a second component of a fuel mixture into the outer port, so that when the inner ports and outer port are open, the two components are injected into the annulus, where they mix to become a combustible fuel mixture; and igniter means in the annulus for detonating the combustible fuel mixture when the inner ports and outer port are closed to create a detonation wave for passing out the open downstream end of the annulus.

2. The apparatus according to claim 1 wherein the outer valve means comprises a rotary valve.

3. The apparatus according to claim 1 wherein one of the components comprises a gaseous hydrocarbon and the other of the components comprises oxygen.

4. The apparatus according to claim 1 wherein the outer valve means comprises:

a stationary spherical concave seat stationarily mounted to the jacket and having a seat passage which aligns with the outer port; and a spherical convex element rotatably carried in the seat and having a valve passage therethrough, the convex element being rotatably driven by the outer valve drive means to cyclically register the valve passage with the seat passage.

5. The apparatus according to claim 1 wherein the outer valve means comprises:

a stationary spherical concave seat stationarily mounted to the jacket and having a seat passage which aligns with the outer port; and a spherical convex element carried in the seat for rotation about an axis of rotation that is parallel to and offset from the longitudinal axis, and having a valve passage therethrough, the convex element being rotatably driven by the outer valve drive means to cyclically register the valve passage with the seat passage.

6. The apparatus according to claim 1, further comprising purge means for flowing a purge gas through the annulus and out the open downstream end after the detonation occurs and before the next injection of fuel mixture is received in the annulus.

7. A pulse detonation apparatus, combination:

a cylinder which has a longitudinal axis, an inner passage extending along the longitudinal axis, and a closed downstream end;

a sleeve which closely receives the cylinder;

a jacket which is spaced outward from the sleeve, providing an annulus between the jacket and the sleeve which has an upstream end wall and an open downstream end;

the cylinder being rotatable relative to the sleeve and jacket;

the sleeve and cylinder each having at least one inner port which cyclically align with each other to communicate the inner passage with the annulus;

at least one outer port in the jacket;

at least one rotary outer valve mounted to the outer port for opening and closing the outer port when rotated;

cylinder drive means for rotating the cylinder relative to the sleeve to open and close the inner ports;

outer valve drive means for rotating the outer valve to open and close the outer port simultaneously with the opening and closing of the inner ports;

manifold means for introducing a first portion of a fuel mixture into the inner passage and another portion of a fuel mixture into the outer port, so that when the inner ports and outer port are open, the two portions are injected into the annulus where they mix to become a combustible fuel mixture; and igniter means in the annulus for detonating the combustible fuel mixture when the inner ports and outer port are closed to create a detonation wave for passing out the open downstream end of the annulus.

8. The apparatus according to claim 7, further comprising purge means for flowing a purge gas through the annulus and out the open downstream end after the detonation occurs and before the next injection of fuel mixture is received in the annulus.

9. The apparatus according to claim 7, further comprising:

a rotatably driven purge valve at the upstream end wall of the annulus for flowing a purge gas through the annulus and out the open downstream end after the detonation occurs and before the next injection of fuel mixture is received in the annulus.

10. The apparatus according to claim 7, wherein the outer valve has an axis of rotation that is parallel to and offset from the longitudinal axis.

11. The apparatus according to claim 7, wherein the outer valve comprises:

a stationary spherical concave seat stationarily mounted to an exterior portion of the jacket and having a seat passage which aligns with the outer port; and a spherical convex element carried in the seat and having a valve passage therethrough, the convex element being rotatably driven by the outer valve drive means to cyclically register the valve passage with the seat passage.

12. The apparatus according to claim 7, further comprising:

a stationary spherical concave seat on an interior portion of the sleeve concentric with the longitudinal axis, the inner port of the sleeve extending through the seat; and a spherical convex element on the cylinder for rotation therewith concentric with the longitudinal axis within the seat, the inner port of the cylinder extending through the spherical element to cyclically register the inner port of the cylinder with the inner port of the sleeve.

13. A pulse detonation apparatus, comprising in combination:

a rotatable cylinder which has a longitudinal axis, an inner passage extending along the longitudinal axis, and a closed downstream end;

a spherical inner convex element on an exterior portion of the cylinder for rotation therewith and having at least one inner port which communicates with the inner passage;

a sleeve which closely receives the cylinder;

a jacket which is slpaced outward from the sleeve, providing an annulus between the jacket and the sleeve which has an upstream end wall and an open downstream end;

a stationary spherical inner concave seat located in an interior portion of the sleeve which rotatably receives the inner convex element, the inner concave seat having at least one inner port which communicates with the annulus and which cyclically registers with the inner port of the inner convex element;

at least one annular seal located between the inner concave seat and inner convex element and surrounding one of the inner ports;

cylinder drive means for rotating the cylinder relative to the sleeve to open and close the inner ports;

at least one stationary spherical outer concave seat located on an exterior portion of the jacket, each of the outer concave seats having an outer port in communication with the annulus;

at least one rotatable spherical outer convex element carried on the outer concave seat and having an axis of rotation that is parallel to and offset from the longitudinal axis, the outer convex element having an outer port which cyclically registers with the outer port of the outer concave seat;

outer valve drive means for rotating the outer convex element to open and close the outer ports;

inner manifold means for introducing a gas into the inner passage;

outer manifold means for introducing a gas into the outer port of the outer convex element, at least one of the gases containing a fuel; and igniter means in the annulus for detonating the fuel when the inner ports and outer ports are closed to create a detonation wave for passing out the open downstream end of the detonation chamber.

14. The apparatus according to claim 13, wherein the outer port in the outer convex element extends from one side to an opposite side of the outer convex element, perpendicular to the axis of rotation of the outer convex element; and the outer port in the outer concave seat has an inner portion which joins the annulus and an outer portion located 180 degrees from the inner portion about the axis of rotation; and wherein the outer manifold means comprises an outer manifold connected to the outer portion of the outer port.

15. The apparatus according to claim 13, further comprising purge means for flowing a purge fluid through the annulus and out the open downstream end after the detonation occurs and before the next injection of fuel is received in the annulus.

16. The apparatus according to claim 13, further comprising:

a purge valve at the upstream end wall of the annulus which is rigidly attached to the cylinder for rotation therewith for flowing a purge fluid through the annulus and out the open downstream end after the detonation occurs and before the next injection of fuel is received in the annulus.

17. The apparatus according to claim 13, wherein there are a plurality of the inner convex elements and mating inner concave seats spaced longitudinally, and a plurality of the outer convex elements and mating outer concave elements spaced longitudinally.

18. The apparatus according to claim 13, wherein the outer valve drive means opens and closes the outer ports simultaneously with the opening and closing of the inner ports.

19. The apparatus according to claim 13, wherein the gas introduced by the inner manifold means comprises a first component of a combustible fuel mixture, and the gas introduced by the outer manifold means comprises a second component of the combustible fuel mixture.

\* \* \* \* \*